United States Patent
Natori et al.

(10) Patent No.: US 8,655,546 B2
(45) Date of Patent: Feb. 18, 2014

(54) VEHICLE DRIVING SUPPORT APPARATUS

(75) Inventors: Kiyoshi Natori, Tokyo (JP); Hiroki Kato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 203 days.

(21) Appl. No.: 13/137,924

(22) Filed: Sep. 21, 2011

(65) Prior Publication Data

US 2012/0078466 A1   Mar. 29, 2012

(30) Foreign Application Priority Data

Sep. 28, 2010   (JP) ................................. 2010-217676

(51) Int. Cl.
*G08G 1/16* (2006.01)
(52) U.S. Cl.
USPC .............................. 701/36; 701/70; 701/301
(58) Field of Classification Search
None
See application file for complete search history.

(56) References Cited

U.S. PATENT DOCUMENTS

| | | | | |
|---|---|---|---|---|
| 6,017,102 A * | 1/2000 | Aga | .............................. | 303/191 |
| 6,023,221 A * | 2/2000 | Michelotti | .................... | 340/471 |
| 6,084,508 A * | 7/2000 | Mai et al. | ....................... | 340/463 |
| 6,543,567 B2 * | 4/2003 | DeLuca et al. | ................ | 180/275 |
| 6,624,747 B1 * | 9/2003 | Friederich et al. | ............. | 340/436 |
| 2003/0201887 A1* | 10/2003 | Gilbert et al. | ................. | 340/479 |
| 2009/0045932 A1* | 2/2009 | Petersen | ....................... | 340/467 |
| 2009/0326820 A1* | 12/2009 | Shimizu | ........................ | 701/301 |

FOREIGN PATENT DOCUMENTS

| | | | |
|---|---|---|---|
| DE | 19500434 A1 * | 6/1995 | |
| DE | 19756419 A1 * | 8/1998 | |
| GB | 2269493 A * | 2/1994 | |
| JP | 2009-262701 A | 11/2009 | |

* cited by examiner

*Primary Examiner* — Michael J Zanelli
(74) *Attorney, Agent, or Firm* — McGinn IP Law Group, PLLC

(57) ABSTRACT

A vehicle driving support apparatus in which a cruise control unit starts to blink a hazard light when it is determined that a subject vehicle is stopped by collision prevention control through an automatic braking intervention. The blinking is continued until a predetermined operation input is performed by a driver so as to call the attention of a driver of a following vehicle or the like even if the driver is upset due to a sudden stop of the subject vehicle.

8 Claims, 3 Drawing Sheets

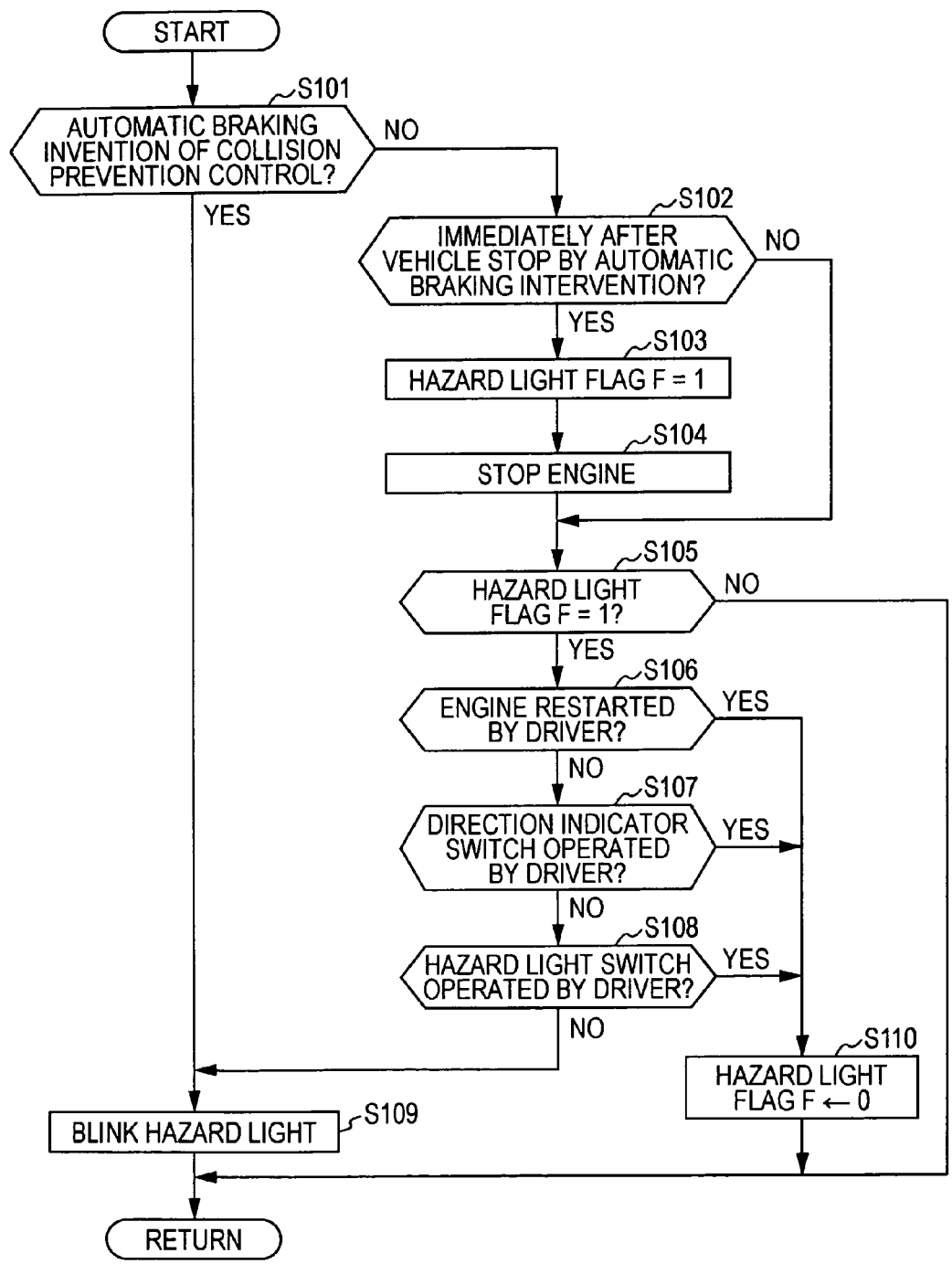

VEHICLE DRIVING SUPPORT APPARATUS

CROSS REFERENCES TO RELATED APPLICATIONS

The present application claims priority from Japanese Patent Application No. 2010-217676 filed on Sep. 28, 2010, the entire contents of which are hereby incorporated by reference.

BACKGROUND OF THE INVENTION

1. Field of the Invention

The present invention relates to vehicle driving support apparatuses for preventing a collision by performing an automatic braking intervention, independently from a brake operation by a driver, when there is a high possibility that a subject vehicle can collide with a target object such as a preceding vehicle.

2. Description of the Related Art

In recent years, there have been various proposals for a vehicle driving support apparatus configured to recognize out-of-vehicle information in front of a vehicle by using a millimeter wave radar, an infrared laser radar, a stereo camera, a monocular camera, or the like, and to execute cruise control for the vehicle based on the recognized out-of-vehicle information. As an example of such cruise control function, there is widely known a function of follow-up cruise control to follow a preceding vehicle when such a vehicle is detected (captured) in front of a subject vehicle. The follow-up cruise control has widely been in practical use as part of adaptive cruise control (ACC). In a typical use of the ACC, the follow-up cruise control is executed when a preceding vehicle is detected in front of the subject vehicle, and constant speed cruise control at a preset speed determined by the driver is executed if no preceding vehicle is detected. In addition, for a vehicle driving support apparatus of this kind, there have been various proposals for collision prevention control (so called pre-crash braking control) that performs an automatic braking intervention, independently from a brake operation by a driver, when there is a high possibility that a subject vehicle can collide with a target object such as a preceding vehicle. For example, Japanese Unexamined Patent Application Publication (JP-A) No. 2009-262701 discloses a technology that sets a braking intervention distance based on a relative relationship between a subject vehicle and a target object recognized in front of the subject vehicle based on environment of a road in front captured by a camera, and performs an automatic braking intervention when the relative distance between the subject vehicle and the target object is equal to or shorter than the braking intervention distance.

When a vehicle is stopped by the above-described collision prevention control through an automatic braking intervention, the driver of the vehicle is generally required to take a measure against secondary accidents such as secondary collision by a following vehicle.

However, typical collision prevention control often brings a vehicle to a sudden stop through automatic braking at a maximum legally permitted braking force. If such a sudden stop is performed, the driver of the vehicle may become upset and may develop difficulty in calmly taking a measure against the secondary accidents.

SUMMARY OF THE INVENTION

The present invention is made in view of the above, and it is an object of the present invention to provide a vehicle driving support apparatus that allows to take a safety measure suitable against a secondary accident likely to occur after an automatic braking intervention.

A vehicle driving support apparatus according to the present invention includes: collision determining unit for determining a collision possibility of a subject vehicle and a target object that is recognized in front of the subject vehicle; braking control unit for performing braking control through an automatic braking intervention when the collision determining unit determines that there is a collision possibility of the subject vehicle and the target object; and vehicle stop maintaining unit for maintaining the subject vehicle in a stop state caused by the automatic braking intervention when such a stop occurs. The vehicle driving support apparatus is provided with hazard light control unit for blinking a hazard light until a predetermined operation input is performed by the driver, when it is determined that the subject vehicle is stopped by the collision prevention control through the automatic braking intervention.

BRIEF DESCRIPTION OF THE DRAWINGS

FIG. 5 is a flowchart of a vehicle control routine that accompanies collision prevention control.

DESCRIPTION OF THE PREFERRED EMBODIMENTS

Figure 1:
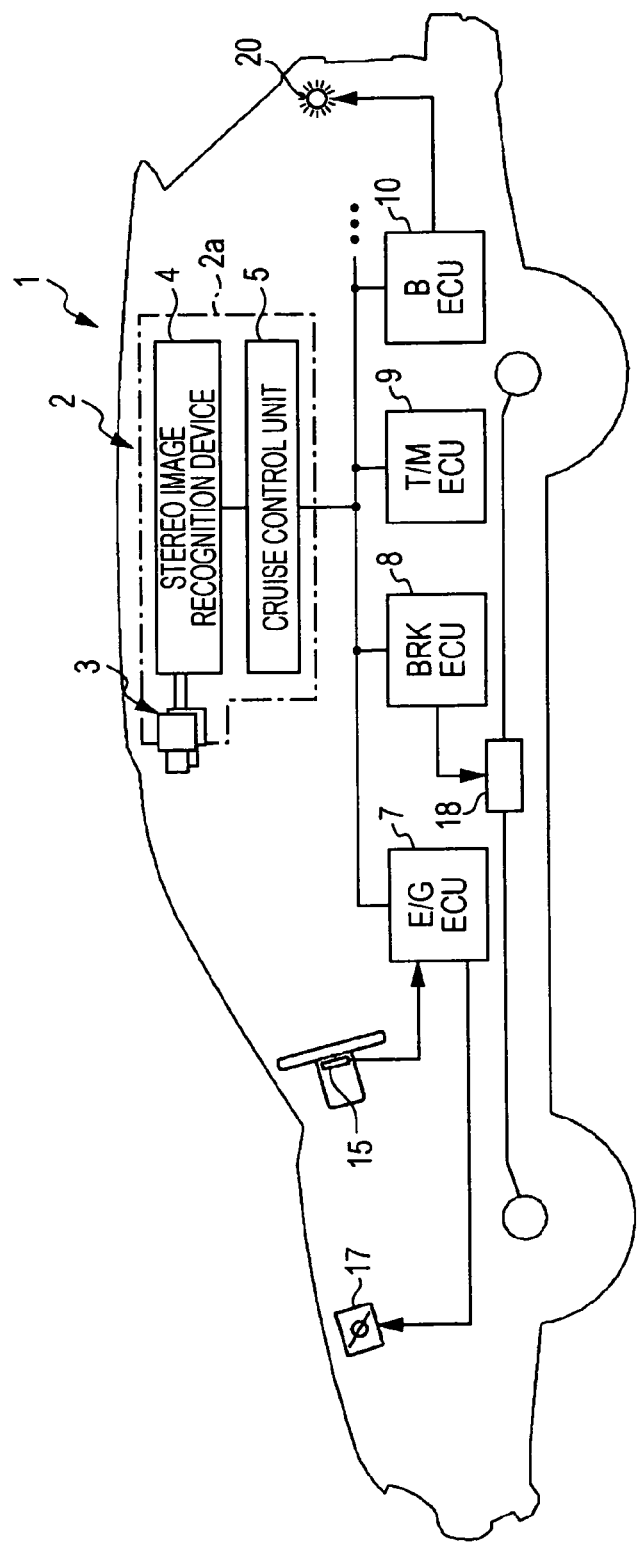
FIG. 1 is a schematic configuration view of a vehicle driving support apparatus installed in a vehicle.
Figure 2:
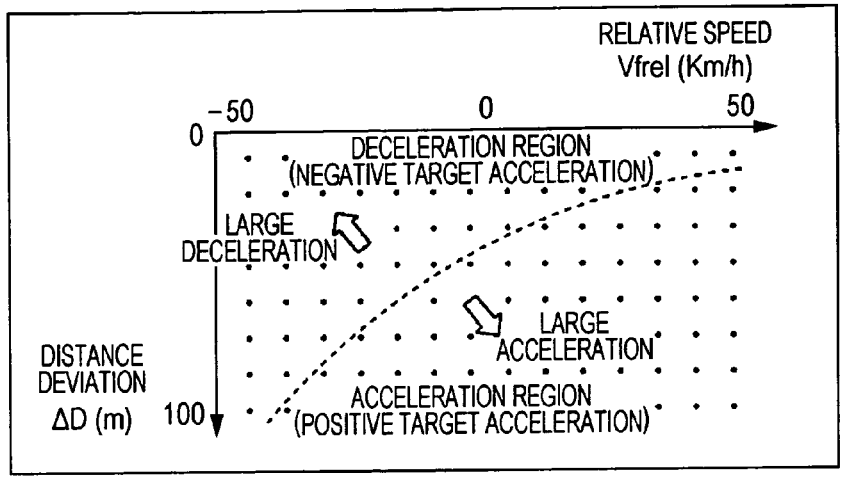
FIG. 2 is an explanatory view showing a map for setting a target acceleration based on a relative speed and a relative distance.
Figure 3:
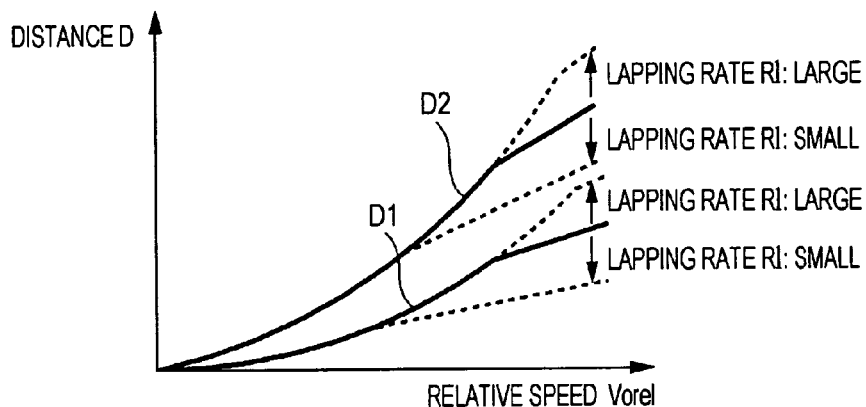
FIG. 3 is a graph showing a relationship of a relative speed, a lapping rate and braking intervention distances between a subject vehicle and a target object.
Figure 4:
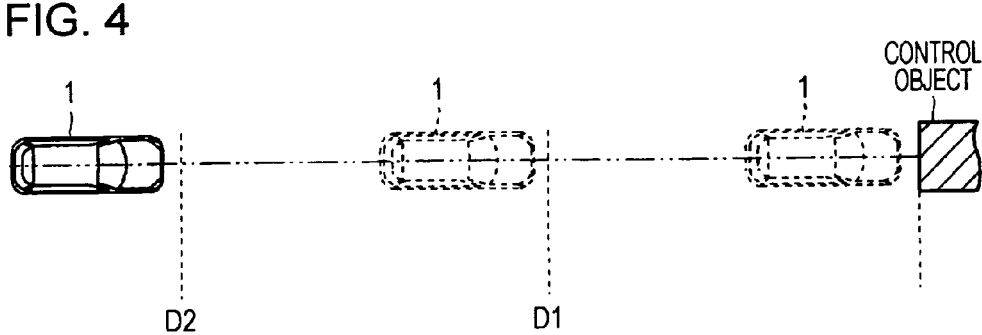
FIG. 4 is an explanatory view showing braking intervention distances that are set between a subject vehicle and a target object.

An embodiment of the present invention will hereunder be described with reference to the drawings. The drawings relate to an embodiment of the present invention: FIG. 1 is a schematic configuration view of a vehicle driving support apparatus installed in a vehicle; FIG. 2 is an explanatory view showing a map for setting a target acceleration based on a relative speed and a relative distance; FIG. 3 is a graph showing a relationship of a relative speed, a lapping rate and braking intervention distances between a subject vehicle and a target object; FIG. 4 is an explanatory view showing braking intervention distances that are set between a subject vehicle and a target object; and FIG. 5 is a flowchart of a vehicle control routine accompanying collision prevention control.

In FIG. 1, reference numeral 1 denotes a vehicle (subject vehicle) such as an automobile. The vehicle 1 includes a vehicle driving support apparatus 2 that has a function of adaptive cruise control (ACC), which is cruise control with a function of inter-vehicle distance control and a collision prevention control function (pre-collision braking control function).

The vehicle driving support apparatus 2 mainly includes, for example, a stereo camera assembly 2a that is integrally provided with a stereo camera 3, a stereo image recognition device and a cruise control unit 5. The cruise control unit 5 of the stereo camera assembly 2a is connected to onboard control units such as an engine control unit (E/G_ECU) 7, a brake control unit (BRK_ECU) 8, a transmission control unit (T/M_ECU) 9, a body control unit (B_ECU) 10 so as to allow two-way communication.

The stereo camera 3 includes a left and right pair of CCD cameras using solid state imaging devices such as charge-coupled devices (CCDs) for example, as a stereo optical system. The CCD cameras in a pair are attached on front portions of a ceiling in a vehicle compartment with a predetermined space therebetween, capture stereo images of an object outside the vehicle from different viewpoints, and output the captured image information to the stereo image recognition device 4.

The stereo image recognition device 4 receives the image information from the stereo camera 3 as well as a subject vehicle speed V and the like from the T/M_ECU 9, for example. The stereo image recognition device 4 recognizes front information such as three-dimensional object data and white road line data in front of the subject vehicle 1 based on the image information from the stereo camera 3, and estimates a traveling route of the subject vehicle based on the recognition information. Furthermore, the stereo image recognition device 4 detects a preceding vehicle in the traveling route of the subject, based on the recognized three-dimensional object data and the like.

The stereo image recognition device 4 processes the image information from the stereo camera 3 in the following manner, for example. Firstly, distance information is generated for a pair of stereo images captured in the traveling direction of the subject vehicle 1 by the stereo camera 3, using an amount of misalignment between corresponding positions in the images according to the principle of triangulation. Then, the image information is subjected to a known grouping process, and the processed information is compared with three-dimensional road shape data, three-dimensional object data and the like, which are previously stored. As a result of the comparison, white road line data, side wall data on a guardrail and a curb extending along the road, and three-dimensional data on a vehicle and the like are extracted. Furthermore, the stereo image recognition device 4 estimates the traveling route of the subject vehicle 1 based on the white road line data, the side wall data and the like, and extracts (detects), as a preceding vehicle, an object that is present in the traveling route of the subject vehicle 1 and moves at a predetermined speed (for example, 0 km/h or more) in almost a same direction as the direction of the vehicle 1. If a preceding vehicle is detected, the stereo image recognition device 4 calculates preceding vehicle information such as a distance (inter-vehicle distance) D from the preceding vehicle, a preceding vehicle speed Vf (=(rate of change in the inter-vehicle distance D)+(the subject vehicle speed V)), and a preceding vehicle acceleration of (a differential value of the preceding vehicle speed Vf). A preceding vehicle that has a speed Vf of a predetermined value or less (for example, 4 km/h or less) and does not accelerate is recognized as a preceding vehicle in a substantially stop state. In this manner, the stereo image recognition device 4 serves as preceding vehicle-detecting unit, together with the stereo camera 3.

The white road line that is recognized by the stereo image recognition device 4 means a boundary line (or a shaded carriageway marking) that is constructed to define a traveling lane. The white road line may be a solid line or a dashed line, and further, in the broad sense, includes a yellow line or the like.

The cruise control unit 5 receives recognition information on the outside in front of the subject vehicle 1 from the stereo image recognition device 4, and the subject vehicle speed V from the T/M_ECU 9, for example.

Further, the cruise control unit 5 receives information on settings set by a driver with a cruise control switch 15 via the E/G_ECU 7, for example. In this embodiment, the cruise control switch 15 is an operation switch configured with, for example, a push switch and a toggle switch disposed on a steering wheel. The cruise control switch 15 includes a cruise switch "CRUISE" that is a main switch and turns on/off the operation of the ACC, a cancellation switch "CANCEL" for canceling the ACC, a setting switch "SET/-" for setting a current subject vehicle speed as a set vehicle speed Vset, an inter-vehicle distance setting switch for setting a mode for the inter-vehicle distance between a preceding vehicle and the subject vehicle, a resume switch "RES/+" for resetting a previously-stored set vehicle speed Vset. In this embodiment, the mode for the inter-vehicle distance is set to any one of "long," "medium" and "short." The cruise control unit 5 sets a target following distance Dtrg of a different value for each of the modes, in accordance with, for example, the subject vehicle speed V.

When the cruise control switch 15 is turned on, the set vehicle speed Vset is set to a value the driver desires through the set switch or the like, and the mode for setting the target following distance Dtrg is set through the inter-vehicle distance setting switch, the cruise control unit 5 executes the ACC.

When no preceding vehicle is detected by the stereo image recognition device 4, the cruise control unit 5 executes, as the ACC, constant speed cruise control that matches the subject vehicle speed V to the set vehicle speed Vset. When a preceding vehicle is detected by the stereo image recognition device 4 during the constant speed cruise control, the cruise control unit 5 performs follow-up cruise control that matches the inter-vehicle distance D to the preceding vehicle to the target following distance Dtrg. The follow-up cruise control also includes a following stop and a following start.

Accordingly, when the constant speed cruise control is started, the cruise control unit 5 calculates a target accelerational for matching the subject vehicle speed V to the set vehicle speed Vset.

Specifically, for example, the cruise control unit 5 calculates a vehicle speed deviation Vsrel between the subject vehicle speed V and the set vehicle speed Vset (=Vset−V) and refers to a preset map so as to calculate the target accelerational corresponding to the vehicle speed deviation Vsrel and the subject vehicle speed V. When, for example, the vehicle speed deviation Vsrel takes a positive value, the target accelerational is set to a larger value within a range having an upper limit corresponding to the subject vehicle V, as the vehicle speed deviation Vsrel becomes larger. When the vehicle speed deviation Vsrel takes a negative value, on the other hand, the target accelerational is set to a smaller value within a range having a lower limit corresponding to the subject vehicle V, as the vehicle speed deviation Vsrel becomes smaller (the target accelerational is set to a larger value as a deceleration as the vehicle speed deviation Vsrel becomes larger on the negative side).

When the cruise control unit 5 shifts from the constant speed control to the follow-up cruise control, the cruise control unit 5 calculates the above-mentioned target accelerational, as well as a target acceleration a2 for matching the inter-vehicle distance D to the target following distance Dtrg.

Specifically, for example, a map for setting the target following distances Dtrg so as to the mode "long" or "short" for the inter-vehicle distance is previously set and stored in the cruise control unit 5. When the mode is set to "long" or "short," the cruise control unit 5 sets the target following distance Dtrg based on the subject vehicle speed V using the corresponding map. When the mode is set to "moderate," the cruise control unit 5 sets the target following distance Dtrg to an intermediate value between the target following distances Dtrg for the "long" mode and the "short" mode. Further, for example, the cruise control unit 5 calculates a distance deviation ΔD between the target following distance Dtrg and the inter-vehicle distance D (=Dtrg−D), and calculates a relative speed Vfrel between the preceding vehicle speed Vf and the subject vehicle speed V (=Vf−V) so as to calculate the target acceleration a2, by referring to a map that uses the distance deviation ΔD and the relative speed Vfrel as parameters. As shown in FIG. 2, the map sets an acceleration region and a deceleration region based on the distance deviation ΔD and the relative speed Vfrel. The target acceleration a2 is set to an acceleration value (positive value) in the acceleration region, while the target acceleration a2 is set to a deceleration value (negative value) in the deceleration region. In the acceleration region, the target acceleration a2 is set to be a lager value (a larger value as an acceleration) as the relative speed Vfrel becomes larger and the distance deviation ΔD becomes larger. In the deceleration region, on the other hand, the target acceleration a2 is set to be a smaller value (a larger value as a deceleration) as the relative speed Vfrel becomes smaller (the relative speed Vfrel becomes larger in the negative side) and the distance deviation ΔD becomes smaller. Furthermore, the calculated target acceleration a2 is subjected to an upper-limit process (clipping process) for example, using an upper limit that is variably set based on the preceding vehicle acceleration of and the subject vehicle speed V Then the cruise control unit 5 sets the target acceleration a1 as the final target acceleration a in the constant speed cruise control, while the cruise control unit 5 sets the target acceleration a1 or the target acceleration a2, whichever is smaller, as the final target acceleration in the follow-up cruise control.

For a case in which, for example, the subject vehicle 1 enters a curve, is coasting during the constant speed cruise control or the follow-up cruise control, another target acceleration in addition to the above-mentioned target accelerations a1 and a2 may be calculated, and the target acceleration with a minimum value among these target accelerations may be set as the final target acceleration a.

After setting the target acceleration a, the cruise control unit 5 controls the opening degree of an electronic throttle control valve 17 (engine output control) through the E/G_ECU 7 so as to generate an acceleration corresponding to the target acceleration a. Furthermore, when it is determined that a sufficient acceleration (deceleration) cannot obtained by the engine output control only, the cruise control unit 5 controls of a hydraulic pressure output from a brake booster 18 through the BRK_ECU (automatic brake intervention control).

When the follow-up cruise control stops the subject vehicle 1 following a preceding vehicle, the cruise control unit 5 maintains the stop state by, for example, operating an electric parking brake, which is not shown. The cruise control unit 5 releases the brake and restarts the ACC on condition that the driver operates an accelerator pedal, or operates the cruise switch of the cruise control switch 15, for example.

Next, the collision prevention control will be described. In the collision prevention control, when there are three-dimensional objects recognized by the stereo image recognition device 4 in the traveling route of the subject vehicle, the cruise control unit 5 recognizes an object closest the subject vehicle as a target object. Examples of the target object includes the aforementioned preceding vehicle recognized by the stereo image recognition device 4 as well as three-dimensional objects that are at a stop in the traveling route of the subject vehicle. When the target object is recognized, the cruise control unit 5 sets braking intervention distances such as a first braking intervention D1 and a second braking intervention D2, based on the target object (see FIG. 4).

The first braking intervention D1 is a distance limit (collision avoidance distance limit) where avoidance of a collision with the target object becomes difficult by either braking or steering. The first braking intervention D1 is previously set, for example, based on an experiment, a simulation or the like. The collision avoidance distance limit changes depending on, for example, a relative speed Vorel (=Vo−V) between the subject vehicle 1 and the target object, and also changes depending on the relative speed Vorel and a lapping rate R1 between the subject vehicle 1 and the target object. A map showing a relationship of the relative speed Vorel and the lapping rate R1 between the subject vehicle 1 and the target object, and the first braking intervention distance D1, as shown in FIG. 3 for example, is previously set and stored in the cruise control unit 5. The cruise control unit 5 sets the first braking intervention distance D1 by referring to the map.

The second braking intervention D2 is set so as to be longer than the first braking intervention D1 by a predetermined distance. Specifically, the second braking intervention D2 is previously set, for example, based on an experiment, a simulation or the like, and is set longer toward the subject vehicle 1 than the collision avoidance distance limit by a predetermined distance depending on the relative speed Vorel. A map showing a relationship of the relative speed Vorel and the lapping rate R1 between the subject vehicle 1 and the target object, and the second braking intervention distance D2, as shown in FIG. 3 for example, is previously set and stored in the cruise control unit 5. The cruise control unit 5 sets the second braking intervention distance D2 by referring to the map.

When a relative distance Do becomes equal to or shorter than the first braking intervention distance D1, the cruise control unit 5 executes braking control through an automatic braking intervention (hereinafter also referred to as full braking control). In the full braking control, for example, the cruise control unit 5 sets each of a deceleration (target deceleration Gt) to generate by braking control and an amount of change in the deceleration (deceleration change amount ΔG1) that is allowed upon generating the target deceleration Gt to a predetermined fixed value, and calculates a deceleration instruction value G based on these values. Then the cruise control unit 5 outputs the calculated deceleration instruction value G to the BRK_ECU8 so as to operate (apply) automatic braking.

When the relative distance Do is longer than the first braking intervention distance D1 and equal to or shorter than the second braking intervention distance D2, the cruise control unit 5 executes braking control with the automatic braking intervention (hereinafter also referred to as enhanced braking control) before executing the full braking control. In the enhanced braking control, for example, the cruise control unit 5 variably sets the target deceleration Gt and the deceleration change amount ΔG1 respectively and calculates the deceleration instruction value G based on these values. Then the cruise control unit 5 outputs the calculated deceleration instruction value G to the BRK_ECU8 to operate (apply) automatic braking.

Then when the subject vehicle 1 is stopped by the automatic braking intervention, the cruise control unit 5 maintains the stop state by, for example, actuating the unillustrated electric parking brake.

The collision prevention control described above can be executed independently, as well as can be used in combination with the ACC. In this case, the automatic braking upon the collision prevention control is of an emergency measure for avoiding a collision with the target object. Thus, when the deceleration instruction value G is set upon the collision prevention control (i.e., when the relative distance Do to the target object becomes equal to or shorter than the second braking intervention distance D2), the deceleration instruction value G is basically set to a value that generates a larger deceleration than the target acceleration a (the target acceleration a in the negative side) of the ACC. Therefore, in principle, the automatic braking intervention in the collision prevention control is given priority over the automatic braking intervention in the follow-up cruise control by the ACC.

In the driving support apparatus 2 provided with the above-mentioned cruise control functions, when the subject vehicle 1 is stopped by the automatic braking intervention of the collision prevention control, the cruise control unit 5 blinks a hazard light 20 via the B_ECU10, as vehicle control accompanying the collision prevention control. In addition, when the subject vehicle 1 is stopped by the automatic braking intervention of the collision prevention control, the cruise control unit 5 according to the present embodiment stops the engine via the E/G_ECU.

The operation input to be performed by the driver for canceling the blinking of the hazard light 20 is preferably one that is related to a safety measure and can be calmly performed by the driver.

Specifically, for example, when the subject vehicle 1 is stopped due to the automatic braking intervention of the collision prevention control and is kept in a stop state, and a restart operation (operation of a starter switch or the like) is performed by the driver, or a direction indicator switch (not shown) is operated by the driver, it can be determined that the driver is promptly restarting traveling, moving to a side of the road, or the like. In this case, the cruise control unit 5 cancels the blinking of the hazard light 20.

Further, for example, when the subject vehicle 1 is stopped due to the automatic braking intervention of the collision prevention control and is kept in a stop state, and the driver operates a hazard light switch (not shown), it can be determined that the driver is canceling the blinking the hazard light 20 at his/her own will. In this case, the cruise control unit 5 cancels the blinking of the hazard light 20.

The cruise control unit 5 may be configured to perform the blinking control of the hazard light 20 not only after the subject vehicle 1 is stopped, but also while the automatic braking intervention of the collision prevention control is being performed.

As described above, in the present embodiment, the cruise control unit 5 implements functions of collision determining unit, braking control unit, vehicle stop maintaining unit, hazard light control unit, and engine stop unit.

Next, the vehicle control that accompanies the collision prevention control and is executed by the cruise control unit 5 will be described with reference to the flowchart of a vehicle control routine shown in FIG. 5.

This routine is executed every predetermined time. When the routine starts, in step S101 the cruise control unit 5 firstly examines whether or not the automatic braking intervention of the collision prevention control is being performed.

If the cruise control unit 5 determines in step S101 that the automatic braking intervention is being performed, the cruise control unit 5 proceeds to step S109.

On the other hand, if the cruise control unit 5 does not determine in step S201 that the automatic braking intervention is being performed, the cruise control unit 5 proceeds to step S102 to examine whether or not the subject vehicle 1 is in a state immediately after it is stopped by the automatic braking intervention.

If the cruise control unit 5 does not determine in step S102 that the subject vehicle 1 is in a state immediately after it is stopped by the automatic braking intervention, the cruise control unit 5 proceeds to step S105.

On the other hand, if the cruise control unit 5 determines that the subject vehicle 1 is in a state immediately after it is stopped by the automatic braking intervention, the cruise control unit 5 proceeds to step S103 to set a hazard light flag F to "1" that instructs the blinking of the hazard light 20. In following step S104, the cruise control unit 5 stops the engine via the E/G_ECU7, and then proceeds to step S105.

When the cruise control unit 5 proceeds from step S102 or step S104 to step S105, the cruise control unit 5 examines whether or not the hazard light flag F is set to "1." If the hazard light flag F is reset to "0," the cruise control unit 5 exits the routine without any change.

On the other hand, if, in step S105, the cruise control unit 5 determines that the hazard light flag F is set to "1", the cruise control unit 5 proceeds to step S106 to examine whether or not the engine was restarted by the driver.

If, in step S106, the cruise control unit 5 determines that the engine was restarted by the driver, the cruise control unit 5 proceeds to step S110. If the cruise control unit 5 does not determine that the engine was restarted by the driver, the cruise control unit 5 proceeds to step S107.

When the cruise control unit 5 proceeds from step 106 to step S107, the cruise control unit 5 examines whether or not the direction indicator switch was operated by the driver.

If, in step S107, the cruise control unit 5 determines that the direction indicator switch was operated by the driver, the cruise control unit 5 proceeds to step S110. If the cruise control unit 5 does not determine that the direction indicator switch was operated by the driver, the cruise control unit 5 proceeds to step S108.

When the cruise control unit 5 proceeds from step 107 to step S108, the cruise control unit 5 examines whether or not the hazard light switch was operated by the driver.

If, in step S108, the cruise control unit 5 determines that the hazard light switch was operated by the driver, the cruise control unit 5 proceeds to step S110. If the cruise control unit 5 does not determine that the hazard light switch was operated by the driver, the cruise control unit 5 proceeds to step S109.

When the cruise control unit 5 proceeds from step 101 or step S108 to step S109, the cruise control unit 5 performs the blinking control of the hazard light 20 via the B_ECU10, and then exits the routine.

On the other hand, when the cruise control unit 5 proceeds from step 106, step S107 or step S108 to step S110, the cruise control unit 5 resets the hazard light flag F to "0," and then exits the routine.

According to the embodiment described above, when it is determined that the subject vehicle 1 is stopped by the automatic braking intervention of the collision prevention control, the hazard light 20 is started to blink, and the blinking is continued until a predetermined operation input is performed by the driver, thereby calling the driver's attention to a following vehicle or the like even if the driver is upset due to a sudden stop of the subject vehicle 1, and allowing the driver to take a safety measure suitable against a secondary accident likely to occur after an automatic braking intervention.

In this case, an operation input that is related to a safety measure (prompt traveling restart, moving to a side of the road or the like) and can be calmly performed by the driver, such as restart operation of the engine and operation of the direction indicator switch, is set as an operation input to be performed by the driver for canceling the blinking of the hazard light 20, whereby the blinking of the hazard light 20 can be canceled at a suitable timing. In other words, for example, if the driver, who is upset due to a sudden stop of the subject vehicle 1, gets out of the vehicle 1 to check the situation of the outside of the vehicle, a reminder for a following vehicle by the blinking of the hazard light 20 is performed until a predetermined operation input is performed, whereby a secondary accident likely to occur after an automatic braking intervention can be appropriately prevented.

Moreover, the engine is stopped when it is determined that the subject vehicle 1 is stopped by the automatic braking intervention of the collision prevention control. Therefore, for example, even if the driver, who is upset due to a sudden stop of the subject vehicle 1, accidentally presses the accelerator pedal, it is possible to maintain the subject vehicle 1 in a stop state, and to take a safety measure suitable against a secondary accident likely to occur after the automatic braking intervention.

What is claimed is:

1. A vehicle driving support apparatus comprising:
   a braking control unit to perform braking control through an automatic braking intervention when detecting that there is a collision possibility of a subject vehicle and a target object that is recognized in front of the subject vehicle;
   a hazard light control unit to blink a hazard light until a predetermined operation input is performed by a driver when it is determined that the subject vehicle is stopped by the braking control through the automatic braking intervention; and
   an engine stop unit to stop an engine when it is determined that the subject vehicle is stopped by the braking control through the automatic braking intervention.

2. A vehicle driving support apparatus comprising:
   a collision determining unit to determine a collision possibility of a subject vehicle and a target object that is recognized in front of the subject vehicle;
   a braking control unit to perform braking control through an automatic braking intervention when the collision determining unit determines that there is a collision possibility of the subject vehicle and the target object;
   a vehicle stop maintaining unit to maintain the subject vehicle in a stop state when a stop occurs caused by the automatic braking intervention;
   a hazard light control unit to blink a hazard light until a predetermined operation input is performed by a driver when it is determined that the subject vehicle is stopped by the braking control through the automatic braking intervention; and
   an engine stop unit to stop an engine when it is determined that the subject vehicle is stopped by the braking control through the automatic braking intervention.

3. The vehicle driving support apparatus according to claim 2, wherein, when the engine is restarted the hazard light control unit cancels the blinking of the hazard lamp.

4. The vehicle driving support apparatus according to claim 2, wherein, when the engine is restarted by the driver, the hazard light control unit cancels the blinking of the hazard lamp.

5. The vehicle driving support apparatus according to claim 2, wherein, when a direction indicator switch is operated the hazard light control unit cancels the blinking of the hazard lamp.

6. The vehicle driving support apparatus according to claim 2, wherein, when a direction indicator switch is operated by the driver, the hazard light control unit cancels the blinking of the hazard lamp.

7. The vehicle driving support apparatus according to claim 2, wherein, when a hazard light switch is operated the hazard light control unit cancels the blinking of the hazard lamp.

8. The vehicle driving support apparatus according to claim 2, wherein, when a hazard light switch is operated by the driver, the hazard light control unit cancels the blinking of the hazard lamp.

* * * * *